(12) United States Patent
Liu

(10) Patent No.: US 11,521,522 B2
(45) Date of Patent: Dec. 6, 2022

(54) DISPLAY-SCREEN SUPPORTING MECHANISM AND ELECTRONIC APPARATUS

(71) Applicant: BEIJING XIAOMI MOBILE SOFTWARE CO., LTD., Beijing (CN)

(72) Inventor: Zhenhua Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 35 days.

(21) Appl. No.: 17/329,396

(22) Filed: May 25, 2021

(65) Prior Publication Data

US 2022/0180778 A1 Jun. 9, 2022

(30) Foreign Application Priority Data

Dec. 7, 2020 (CN) .......................... 202011440791.1

(51) Int. Cl.
*G06F 1/16* (2006.01)
*G09F 9/30* (2006.01)

(52) U.S. Cl.
CPC ............ *G09F 9/301* (2013.01); *G06F 1/1601* (2013.01)

(58) Field of Classification Search
CPC combination set(s) only.
See application file for complete search history.

(56) References Cited

U.S. PATENT DOCUMENTS

| 9,519,313 | B2* | 12/2016 | Kim | G06F 1/166 |
|---|---|---|---|---|
| 10,684,714 | B2* | 6/2020 | Seo | G06F 3/044 |
| 2016/0170450 | A1* | 6/2016 | Kim | G06F 1/166 |
| | | | | 361/807 |
| 2018/0081473 | A1* | 3/2018 | Seo | G06F 1/3215 |
| 2018/0188778 | A1* | 7/2018 | Shin | G06F 1/1624 |
| 2020/0272271 | A1* | 8/2020 | Seo | H05K 5/0217 |
| 2022/0132687 | A1* | 4/2022 | Liu | G06F 1/1652 |
| 2022/0183167 | A1* | 6/2022 | Liu | H05K 5/0217 |

OTHER PUBLICATIONS

European Patent Application No. 21176782.7 extended Search and Opinion dated Nov. 24, 2021, 7 pages.

* cited by examiner

*Primary Examiner* — Lisa Lea-Edmonds
(74) *Attorney, Agent, or Firm* — Lathrop GPM LLP

(57) ABSTRACT

A display-screen supporting mechanism and an electronic apparatus are provided. The electronic apparatus includes a display screen with a first end and a second end arranged oppositely, a housing and a movable assembly; the first end is connected with the housing, the second end is connected with the movable assembly, and the movable assembly may be moved relative to the housing, such that the second end is close to or away from the first end; and the mechanism includes a fixed supporting member configured to be connected with the housing and a movable supporting member configured to be connected with the movable assembly. One of the fixed and movable supporting members is provided with a guide groove, the other is provided with a guide rail, and the fixed and movable supporting members are movably connected by means of the guide groove and the guide rail.

20 Claims, 4 Drawing Sheets

DISPLAY-SCREEN SUPPORTING MECHANISM AND ELECTRONIC APPARATUS

CROSS-REFERENCE TO RELATED APPLICATION

The present application is based on and claims priority to Chinese Patent Application Serial No. 202011440791.1, filed on Dec. 7, 2020, the entire content of which is incorporated herein by reference.

TECHNICAL FIELD

The present disclosure relates to a technical field of electronic apparatus, and more particularly to a display-screen supporting mechanism and electronic apparatus.

BACKGROUND

The market for flexible display screens is expected to grow significantly over the next few years. Deformation characteristics of the flexible display screen enrich usage configurations of an electronic apparatus. For example, the flexible display screen may form a telescopic screen. In the electronic apparatus with the telescopic screen, stretched configuration and retracted configuration of the display screen may be realized by stretching and retracting. How to provide effective support for the display screen in a stretched state is a design difficulty.

SUMMARY

The present disclosure provides a display-screen supporting mechanism and electronic apparatus to solve technical defects in related art.

In a first aspect, embodiments of the present disclosure provide a display-screen supporting mechanism applied in electronic apparatus, wherein the electronic apparatus includes a display screen, a housing and a movable assembly; the display screen includes a first end and a second end arranged oppositely, the first end is connected with the housing, the second end is connected with the movable assembly, and the movable assembly is movable relative to the housing, such that the second end is close to or away from the first end; the mechanism is configured to bear the display screen, and specifically includes: a fixed supporting member configured to be connected with the housing; and a movable supporting member configured to be connected with the movable assembly; and one of the fixed and movable supporting members comprising a guide groove, the other is provided with a guide rail, and the fixed and movable supporting members are movably connected by means of the guide groove and the guide rail.

In a second aspect, embodiments of the present disclosure provide electronic apparatus, including: a housing; a movable assembly movably connected with the housing relatively; a display screen including a first end and a second end arranged oppositely, the first end being connected with the housing, and the second end being connected with the movable assembly; and a display-screen supporting mechanism located below the display screen and including: a fixed supporting member configured to be connected with the housing; and a movable supporting member configured to be connected with the movable assembly; wherein one of the fixed and movable supporting members is provided with a guide groove, the other is provided with a guide rail, and the fixed and movable supporting members are movably connected by means of the guide groove and the guide rail.

The display-screen supporting mechanism and the electronic apparatus according to the present disclosure at least have the following beneficial effects.

The display-screen supporting mechanism according to the embodiments of the present disclosure adapts to stretched and retracted forms of the electronic apparatus with fixed and movable supporting portions which move relatively, such that the flexible display screen is comprehensively supported and protected.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Exemplary embodiments of the present disclosure will be described in details herein, and the examples thereof are illustrated in the accompanying drawings. When the description below concerns the drawings, same numbers in different drawings represent same or similar elements unless indicated otherwise. In the following exemplary embodiments, the embodiments illustrated do not represent all embodiments consistent with the present disclosure. Instead, they are merely examples of devices and methods consistent with some aspects of the present disclosure as detailed in the appended claims.

The terms used in the present disclosure are merely for the purpose of describing specific embodiments, which are not intended to limit the present disclosure. Unless defined otherwise, the technical or scientific terminologies used in the present disclosure shall be the general meaning understood by those skilled in the related art of the present disclosure. Terms such as "one" or "a" do not refer to quantity limitation, but to indicate the existence of at least one. Unless specified otherwise, terms such as "comprise" or "including" and the like mean that the elements or objects presented before "comprise" or "including" contain the elements or objects presented after "comprise" or "including" and their equivalents, which do not exclude other elements or objects. The terms "mounted," "connected," and the like are not restricted to physical or mechanical connections, may also be electrical connections, no matter direct or indirect. As used in the descriptions and the appended claims of the present disclosure, "a" "said" and "the" in singular forms mean including plural forms, unless clearly indicated in the context otherwise. It should also be understood that, as used herein, the term "and/or" represents and contains any and all possible combinations of one or more associated listed items.

Embodiments of the present disclosure provide a display-screen supporting mechanism and electronic apparatus, and a display screen located at a front surface of an electronic apparatus is supported by the display-screen supporting mechanism. Especially in a stretched form, the display screen is guaranteed to be smooth by the supporting mechanism to avoid a depression. To facilitate the description of overall solution, the display-screen supporting mechanism is described below in conjunction with structure of the electronic apparatus.

In the embodiments of the present disclosure, the electronic apparatus includes, but not limited to: a smart phone, a tablet computer, a desktop/laptop/handheld computer, a notebook computer, an ultra-mobile personal computer (UMPC), a personal digital assistant (PDA), and an augmented reality (AR)/virtual reality (VR) apparatus. The attached drawings only use the mobile phone as an example to illustrate.

Figure 1:
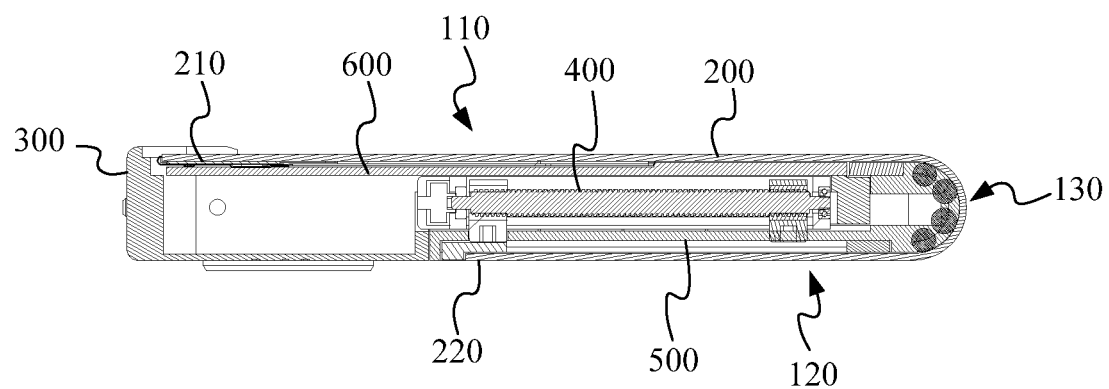
FIG. 1 is a schematic view of electronic apparatus according to an exemplary embodiment.

FIG. 1 is a schematic view of electronic apparatus according to an exemplary embodiment. As illustrated in FIG. 1, the electronic apparatus has a front surface 110, a rear surface 120, and a side surface 130. The side surface 130 is connected with the front surface 110 and the rear surface 120. The electronic apparatus further includes a flexible display screen 200 including a first end 210 and a second end 220. The first end 210 of the flexible display screen 200 is provided at the front surface 110 of the electronic apparatus, and the second end 220 extends from the side surface 130 of the electronic apparatus to the rear surface 120 of the electronic apparatus. Thus, the flexible display screen 200 is continuously distributed at the front surface 110, the side surface 130 and the rear surface 120 of the electronic apparatus.

The electronic apparatus further includes a housing 300, a driving assembly 400, and a movable assembly 500. The housing 300 is movably connected with the movable assembly 500, and the driving assembly 400 is configured to drive the movable assembly 500 to be close to or away from the housing 300. The first end 210 of the flexible display screen 200 is connected with the housing 300, and the second end 220 of the flexible display screen 200 is connected with the movable assembly 500. A part of the flexible display screen 200 located on the side surface 130 of the electronic apparatus abuts against the movable assembly 500.

When the driving assembly 400 drives the movable assembly 500 away from the housing 300, the movable assembly 500 applies an acting force to the part of the flexible display screen located on the side surface 130 of the electronic apparatus, so as to drive the second end 220 of the flexible display screen 200 away from the first end 210. Thus, the electronic apparatus is in the stretched form, and size of the flexible display screen 200 at the front surface 110 of the electronic apparatus becomes larger.

When the driving assembly 400 drives the movable assembly 500 close to the housing 300, the movable assembly 500 drives the flexible display screen to move towards a direction close to the housing 300, so as to drive the second end 220 of the flexible display screen 200 close to the first end 210. Thus, the electronic apparatus is in a retracted form, and the size of the flexible display screen 200 at the front surface 110 of the electronic apparatus becomes smaller.

Figure 2:
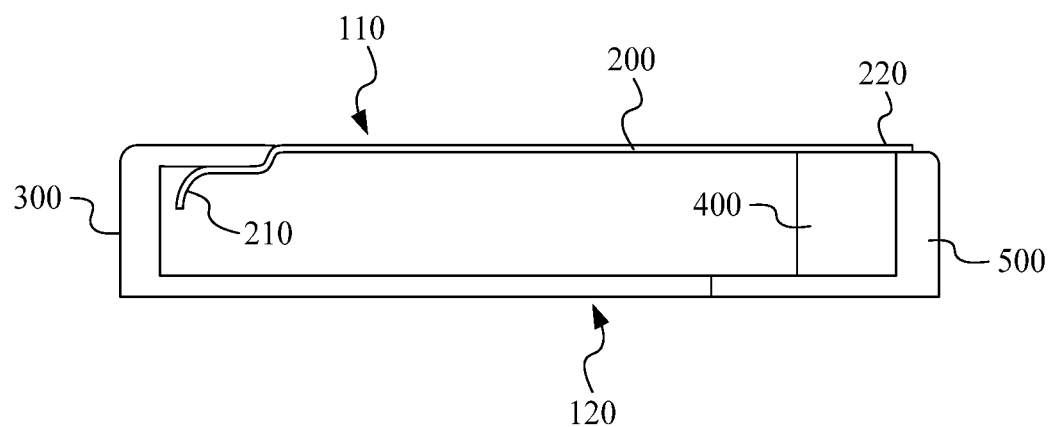
FIG. 2 is a schematic view of electronic apparatus according to another exemplary embodiment.

FIG. 2 is a schematic view of electronic apparatus according to another exemplary embodiment. As illustrated in FIG. 2, a flexible display screen 200 includes a first end 210 and a second end 220 arranged oppositely. A part of the flexible display screen 200 close to the first end 210 is provided inside the electronic apparatus, and the second end 220 is provided at the front surface 110 of the electronic apparatus. Optionally, the first end 210 is provided within the housing 300, and the second end 220 is connected with the movable assembly 500.

When a driving assembly 400 drives the movable assembly 500 away from the housing 300, the movable assembly 500 drives the second end 220 of the flexible display screen 200 away from the first end 210, and pulls the part of the flexible display screen located in the housing 300 to an exterior of the housing 300. Thus, the electronic apparatus is in the stretched form, and the size of the flexible display screen 200 at the front surface 110 of the electronic apparatus becomes larger.

When the driving assembly 400 drives the movable assembly 500 away from the housing 300, the movable assembly 500 drives the second end 220 of the flexible display screen 200 close to the first end 210. At this point, the electronic apparatus is in the retracted form, and the size of the flexible display screen 200 at the front surface 110 of the electronic apparatus becomes smaller.

Based on the above-mentioned electronic apparatus, the embodiments of the present disclosure provide the display-screen supporting mechanism which may be adapted to the stretched and retracted forms of the electronic apparatus, and provides stable support for the flexible display screen.

Figure 3A:
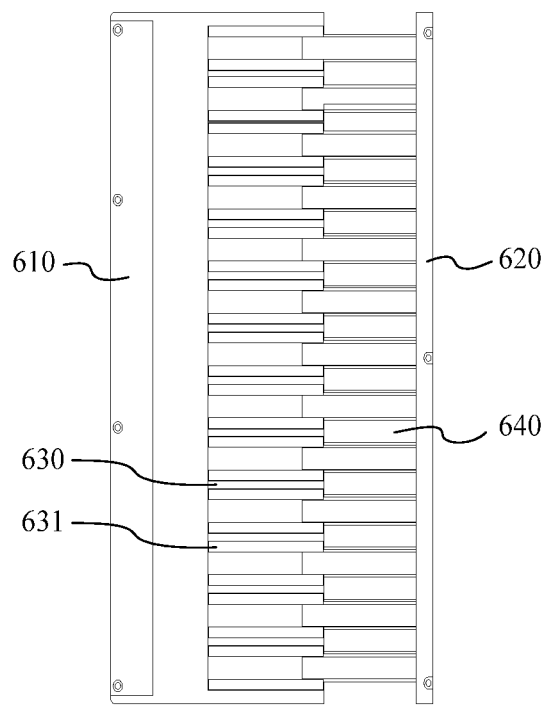
FIGS. 3a and 3b are schematic views of a display-screen supporting mechanism according to an exemplary embodiment in different forms.
Figure 3B:
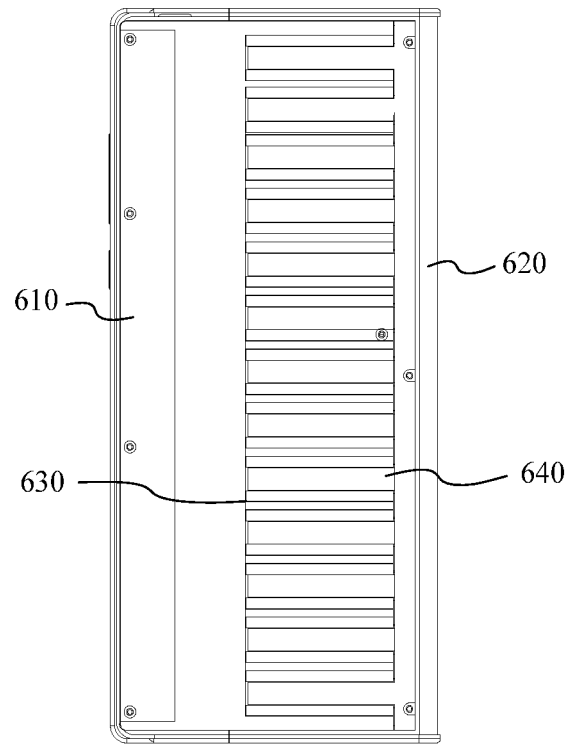

FIGS. 3a and 3b are schematic views of a display-screen supporting mechanism in different forms according to an exemplary embodiment. As illustrated in FIGS. 3a and 3b, the display-screen supporting mechanism 600 is provided below the flexible display screen 200 for carrying the flexible display screen 200. Specifically, the display-screen supporting mechanism 600 includes a fixed supporting member 610 and a movable supporting member 620.

Figure 4:
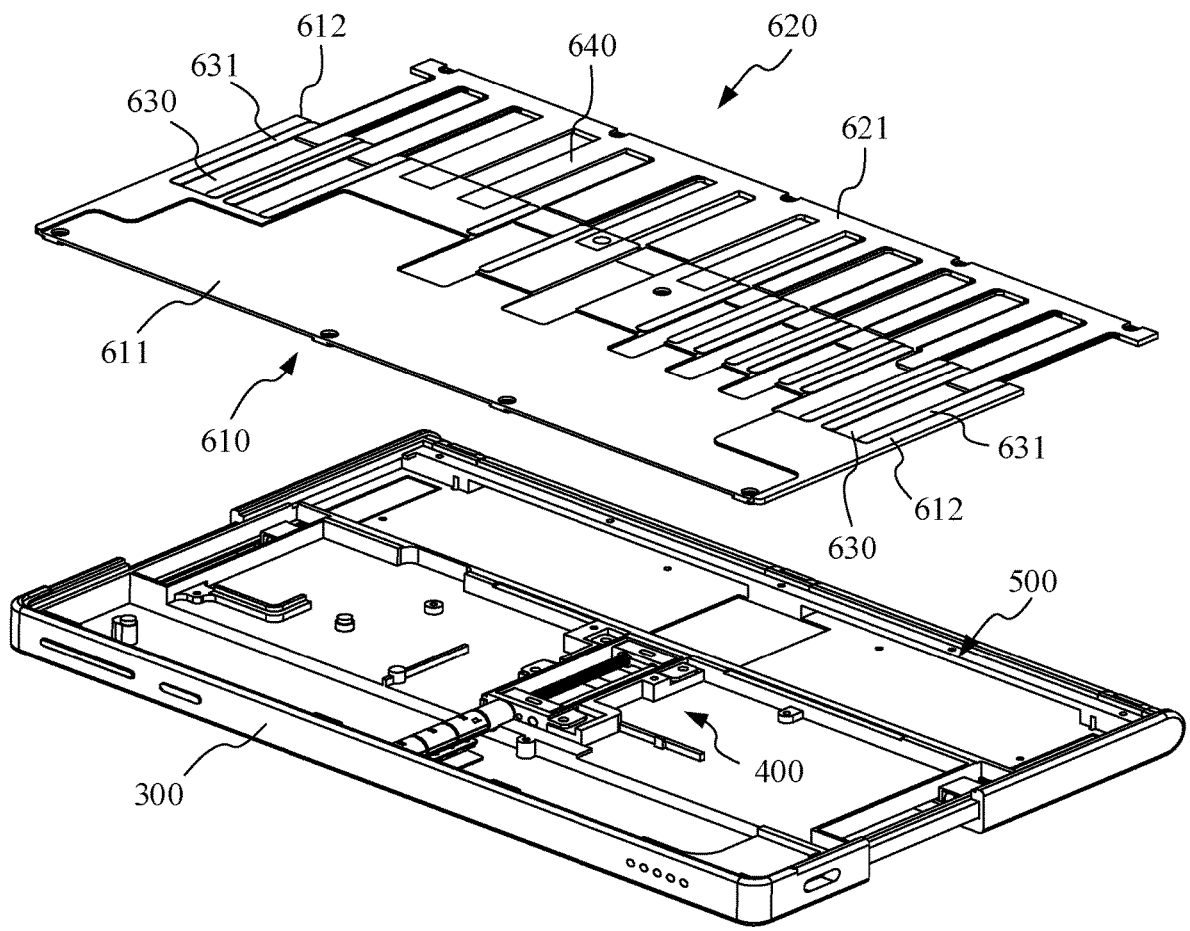
FIG. 4 is a schematic view of assembly of the display-screen supporting mechanism in the electronic apparatus according to an exemplary embodiment.

FIG. 4 is a schematic view of assembly of the display-screen supporting mechanism in the electronic apparatus according to an exemplary embodiment. As illustrated in FIG. 4, the fixed supporting member 610 is configured to be connected with the housing 300. The movable supporting member 620 is configured to be connected with the movable assembly 500. One of the fixed and movable supporting members 610, 620 includes a guide groove 630, the other is provided with a guide rail 640, and the fixed and movable supporting members 610, 620 are movably connected by means of the guide groove 630 and the guide rail 640. In embodiments, a surface of one of supporting members 610 and 620 forms guide groove 630, such that guide groove 630 is part of said surface.

In this way, as the movable assembly 500 is moved relative to the housing 300, the fixed and movable supporting members 610, 620 are driven to be moved relative to each other. Specifically, as illustrated in FIGS. 1 and 3a, when the electronic apparatus is in the stretched form, the movable assembly 500 is away from the housing 300, and the movable supporting member 620 is driven away from the fixed supporting member 610. As illustrated in FIGS. 1 and 3b, when the electronic apparatus is in the retracted form, the movable assembly 500 is close to the housing 300, and the movable supporting member 620 is driven close to the fixed supporting member 610.

In this way, the display-screen supporting mechanism 600 is able to adapt to both the stretched and retracted forms of the electronic apparatus, and may provide effective support for the flexible display screen 200 in both the stretched and retracted forms of the electronic apparatus.

In the embodiments of the present disclosure, there is no limitation in the arrangement of the guide rail and the guide groove, and in the accompanying drawings, only taking the guide groove 630 being provided at the fixed supporting member 610, and the guide rail 640 being provided at the movable supporting member 620 as an example.

In one embodiment, the fixed supporting member 610 includes a fixed portion 611 and at least two guide portions 612 connected with the fixed portion 611. For example, the guide portion 612 is connected with one edge of the fixed portion 611 and extends in a direction away from the fixed portion 611. The fixed portion 611 is configured to be connected with the housing in the electronic apparatus. The guide groove 630 is provided on the guide portion 612, and is configured to be inserted with the guide rail 640 of the movable supporting member 620.

The movable supporting member 620 includes a connecting portion 621 and at least two guide rails 640 connected with the connecting portion 621. The guide rail 640 is connected with one edge of the connecting portion 621 and extends in a direction away from the connecting portion 621. The connecting portion 621 is configured to be connected with the movable assembly in the electronic apparatus. Thus, the movable and fixed supporting members 620, 610 may be moved synchronously with relative movement of the housing and the movable assembly.

Figure 5A:
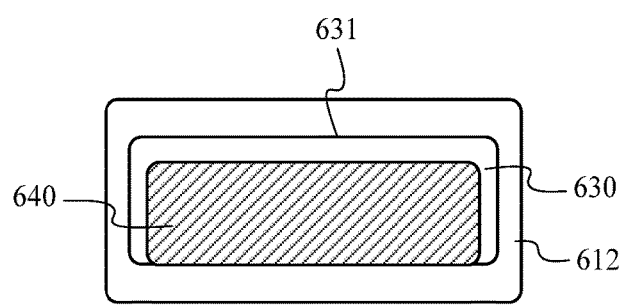
FIGS. 5a and 5b are schematic views of a guide groove according to various exemplary embodiments.
Figure 5B:
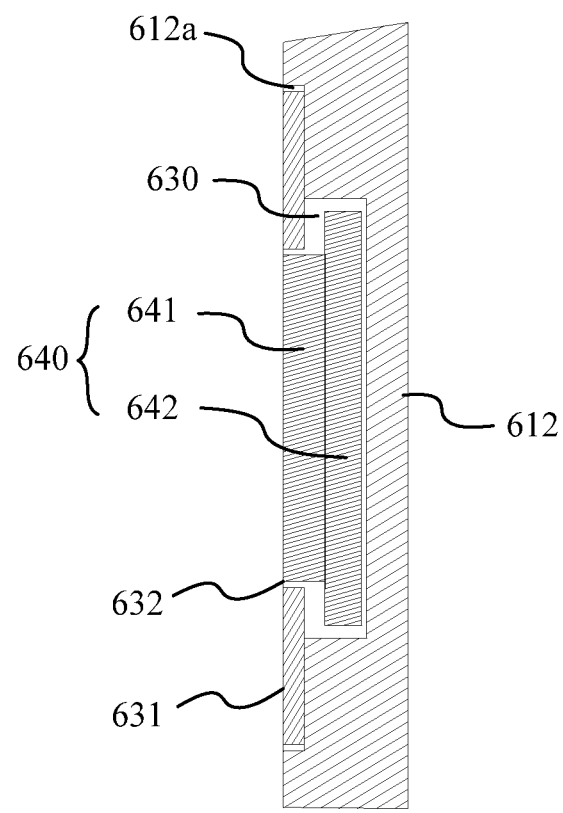

Two different arrangements of the guide groove 630 are provided in the embodiments of the present disclosure, and FIGS. 5a and 5b are schematic views of the guide groove according to various exemplary embodiments.

<First Arrangement>

As illustrated in FIG. 5a, the guide portion 612 has a hollow rod-shaped structure, and the hollow part of the guide portion 612 forms the guide groove 630. An inner wall of the guide groove 630 forms the limiting member 631 to limit the guide rail 640 in a direction perpendicular to a length of the guide groove 630. In this way, the guide groove 630 fully protects structural safety of the guide rail 640. In this solution, shape of a radial cross section of the guide groove 630 is not specifically limited, and may be, for example, a rectangular shape, a circular shape, or the like.

<Second Arrangement>

As illustrated in FIG. 5b in conjunction with FIG. 3a, the guide groove 630 forms an opening 632 on the guide portion 612, and the opening 632 is distributed along a length direction of the guide groove 630. When inserted into the guide groove 630, the guide rail 614 is exposed outside the guide groove 630 through the opening 632. In addition, surface of the guide rail 614 exposed outside the guide groove 630 is flush with surface of the guide portion 612 around the opening 632. Thus, a plane formed by the guide rail 614 and the guide portion 612 may stably support the flexible display screen 200.

In this way, a processing difficulty of the whole supporting mechanism may be reduced. Especially when the guide portion 612 has a small thickness, the guide groove 630 having the opening 632 is easier to provide.

Further, the limiting member 631 is provided on the guide portion 612 at an edge of the opening 632 of the guide groove 630 and extends transversely towards the opening 632. Size of the opening 632 is reduced by the limiting member 631. The limiting member 631 is configured to limit the guide rail 640 in the guide groove 630 in a direction perpendicular to a length of the guide rail, thereby improving structural stability of overall supporting mechanism.

Optionally, a recessed region 612a is provided at the edge of the opening 632 of the guide portion 612, and the limiting member 631 is mounted in the recessed region 612a. Thus, outer surfaces of the limiting member 631, the guide rail 614 and the guide portion 612 are flush to provide stable support for the flexible display screen.

There are various ways for the arrangement of the limiting member 631.

Optionally, the limiting member 631 is provided at one edge of the opening 632. Or, the limiting members 631 are arranged at two opposite edges of the opening 632.

Optionally, the limiting member 631 runs through the length direction of the guide groove 630. Or, the display-screen supporting structure includes a plurality of limiting members 631 spaced apart by a set distance along the length direction of the guide groove 630.

In addition, based on the structure of the guide groove 630 provided in FIG. 5b, the guide rail 640 includes a first portion 641 and a second portion 642. The first and second portions 641, 642 are arranged along a depth direction h1 of the guide groove 630, and the first portion 641 is relatively close to the opening 632. The second portion 642 is provided beyond the first portion 641 in a direction perpendicular to a depth h1 of the guide groove. A part of the second portion 642 beyond the first portion 641 is provided corresponding to the limiting member 631. In this way, the limiting member 631 is fitted with the second portion 642, such that the guide rail 640 is not separated from the guide groove 630, thus guaranteeing the structural stability of the overall display-screen supporting mechanism.

Moreover, the first portion 641 is exposed outside the guide groove 630 through the opening 632, and the outer surfaces of the first portion 641, the limiting member 631, and the guide portion 612 are flush with each other. Optionally, a gap is defined between a side wall of the limiting member 631 and a side wall of the first portion 641. And/or, a gap is defined between a side wall of the guide groove 630 and a side wall of the second portion 642. For example, a gap of 0.05-0.2 mm is reserved, such that the guide rail 640 may be guaranteed to smoothly slide along the guide groove 630, and a blocking phenomenon is avoided.

The display-screen supporting mechanism according to the embodiments of the present disclosure adapts to the stretched and retracted forms of the electronic apparatus with fixed and movable supporting portions which move relatively, such that the flexible display screen is fully supported and protected.

Other embodiments of the disclosure will be apparent to those skilled in the art from consideration of the specification and practice of the disclosure disclosed here. This disclosure is intended to cover any variations, uses, or adaptations of the invention following the general principles thereof and including such departures from the present disclosure as come within known or customary practice in the art. It is intended that the specification and embodiments be considered as exemplary only, with a true scope and spirit of the disclosure being indicated by the appended claims.

What is claimed is:

1. A display-screen supporting mechanism applied in an electronic apparatus, wherein the electronic apparatus comprises a display screen, a housing and a movable assembly; the display screen comprises a first end and a second end arranged oppositely, the first end is connected with the housing, the second end is connected with the movable assembly, and the movable assembly is movable relative to the housing, such that the second end is close to or away from the first end;

the mechanism is configured to carry the display screen, and specifically comprises:

a fixed supporting member configured to be connected with the housing; and a movable supporting member configured to be connected with the movable assembly; and one of the fixed and movable supporting members comprising a guide groove, the other is provided with a guide rail, and the fixed and movable supporting members are movably connected by means of the guide groove and the guide rail.

2. The display-screen supporting mechanism according to claim 1, wherein a limiting member is provided on the guide groove and configured to limit the guide rail in the guide groove in a direction perpendicular to a length of the guide groove.

3. The display-screen supporting mechanism according to claim 2, wherein the guide groove is provided with an opening on the fixed supporting member or the movable supporting member;

the opening is provided along a length direction of the guide groove; and the limiting member is provided at an edge of the opening of the guide groove and transversely extends towards the opening.

4. The display-screen supporting mechanism according to claim 3, wherein the limiting member is provided along the length direction of the guide groove and at least disposed at an opening of one edge of the guide groove.

5. The display-screen supporting mechanism according to claim 4, wherein the limiting member runs through the length direction of the guide groove.

6. The display-screen supporting mechanism according to claim 3, wherein the guide rail comprises a first portion and a second portion arranged along a depth direction of the guide groove, and the first portion is relatively close to the opening; and in a direction perpendicular to a depth of the guide groove, the second portion is provided beyond the first portion, and a part of the second portion beyond the first portion is provided corresponding to the limiting member.

7. The display-screen supporting mechanism according to claim 6, wherein a gap is defined between the limiting member and a side wall of the first portion; or a gap is defined between a side wall of the guide groove and a side wall of the second portion; or a gap is defined between the limiting member and a side wall of the first portion; and a gap is defined between a side wall of the guide groove and a side wall of the second portion.

8. The display-screen supporting mechanism according to claim 2, wherein the fixed supporting member comprises a fixed portion and at least two guide portions connected with the fixed portion, and the guide grooves are provided on the guide portions; and the movable supporting member comprises a connecting portion and at least two guide rails connected to the connecting portion, and each of the guide rails is mounted in one corresponding guide groove.

9. The display-screen supporting mechanism according to claim 8, wherein the fixed portion is configured to be connected with the housing in the electronic apparatus.

10. The display-screen supporting mechanism according to claim 8, wherein the guide rail is connected with one edge of the connecting portion and extends in a direction away from the connecting portion, and the connecting portion is configured to be connected with the movable assembly in the electronic apparatus.

11. The display-screen supporting mechanism according to claim 8, wherein the guide portion has a hollow rod-shaped structure.

12. The display-screen supporting mechanism according to claim 11, wherein shape of a radial cross section of the guide groove is a rectangular shape or a circular shape.

13. The display-screen supporting mechanism according to claim 8, wherein surface of the guide rail exposed outside the guide groove is flush with surface of the guide portion around the opening.

14. The display-screen supporting mechanism according to claim 8, wherein a recessed region is provided at an edge of the opening of the guide portion, and the limiting member is mounted in the recessed region.

15. The display-screen supporting mechanism according to claim 2, wherein there are a plurality of limiting members spaced apart by a set distance along the length direction of the guide groove.

16. An electronic apparatus, comprising:
a housing;
a movable assembly movably connected with the housing relatively;
a display screen comprising a first end and a second end arranged oppositely, the first end being connected with the housing, and the second end being connected with the movable assembly; and
a display-screen supporting mechanism located below the display screen, and comprising:
a fixed supporting member configured to be connected with the housing; and
a movable supporting member configured to be connected with the movable assembly;
wherein one of the fixed and movable supporting members is provided with a guide groove, the other is provided with a guide rail, and the fixed and movable supporting members are movably connected by means of the guide groove and the guide rail.

17. The electronic apparatus according to claim 16, wherein the electronic apparatus has a front surface, a rear surface, and a side surface, the side surface is connected with the front surface and the rear surface, and
the electronic apparatus further comprises a driving assembly configured to drive the movable assembly to be close to or away from the housing.

18. The electronic apparatus according to claim 17, wherein a part of the display screen close to the first end is provided inside the electronic apparatus, and the second end is provided at the front surface of the electronic apparatus.

19. The electronic apparatus according to claim 16, wherein the fixed supporting member comprises a guide portion, and the display screen is connected with the guide portion.

20. The electronic apparatus according to claim 16, wherein a limiting member is provided on the guide groove and configured to limit the guide rail in the guide groove in a direction perpendicular to a length of the guide groove.

* * * * *